United States Patent
Riemer

(10) Patent No.: US 11,589,173 B2
(45) Date of Patent: *Feb. 21, 2023

(54) HEARING AID COMPRISING A RECORD AND REPLAY FUNCTION

(71) Applicant: Oticon A/S, Smørum (DK)

(72) Inventor: Lars Riemer, Smørum (DK)

(73) Assignee: OTICON A/S, Smørum (DK)

(*) Notice: Subject to any disclaimer, the term of this patent is extended or adjusted under 35 U.S.C. 154(b) by 0 days.

This patent is subject to a terminal disclaimer.

(21) Appl. No.: 17/548,094

(22) Filed: Dec. 10, 2021

(65) Prior Publication Data
US 2022/0103952 A1  Mar. 31, 2022

Related U.S. Application Data

(63) Continuation of application No. 17/003,559, filed on Aug. 26, 2020, now Pat. No. 11,265,661.

(51) Int. Cl.
*H04R 25/00* (2006.01)
*G06F 3/16* (2006.01)
*G10L 25/84* (2013.01)

(52) U.S. Cl.
CPC .......... *H04R 25/505* (2013.01); *G06F 3/165* (2013.01); *G06F 3/167* (2013.01); *G10L 25/84* (2013.01); *H04R 25/75* (2013.01); *H04R 2225/41* (2013.01); *H04R 2225/43* (2013.01)

(58) Field of Classification Search
CPC .......... H04R 2225/43; H04R 2460/01; H04R 25/505
USPC ................................... 381/312, 314
See application file for complete search history.

(56) References Cited

U.S. PATENT DOCUMENTS

| 8,300,861 B2 | 10/2012 | Pontoppidan |
| 2010/0135511 A1 | 6/2010 | Pontoppidan |

FOREIGN PATENT DOCUMENTS

EP    2 876 902 A1    5/2015

OTHER PUBLICATIONS

Liu et al., "Enriching Speech Recognition with Automatic Detection of Sentence Boundaries and Disfluencies", IEEE Transactions on Speech & Audio Processing, Oct. 2006, pp. 1-15 (16 pages).

*Primary Examiner* — George C Monikang
(74) *Attorney, Agent, or Firm* — Birch, Stewart, Kolasch & Birch, LLP

(57) ABSTRACT

A hearing aid comprises a) an input transducer; b) an output transducer; c) an input buffer connected to the input transducer configured to store audio data representing one or more time segments of an electric input signal; d) an own voice detector for providing an own voice control signal, and e) a combiner allowing to insert audio data from the input buffer in a forward audio signal path. The hearing aid further comprises f) an input controller configured to control storage of a time segment of the electric input signal in dependence of said own voice control signal; and g) an output controller configured to select audio data from said one or more time segments of the electric input signal currently stored in the input buffer for insertion in the forward path in dependence of an output control signal originating from the user.

20 Claims, 7 Drawing Sheets

HEARING AID COMPRISING A RECORD AND REPLAY FUNCTION

CROSS-REFERENCE TO RELATED APPLICATION

This application is a Continuation of copending application Ser. No. 17/003,559, filed on Aug. 26, 2020, which is hereby expressly incorporated by reference into the present application.

The present application relates to hearing aids, in particular to the provision of an easy-to-use option of giving a hearing aid wearer the possibility to hear again what has just been said without having to ask for a repetition. U.S. Pat. No. 8,300,861B2 deals with the same problem and proposes to replay a recorded audio stream at a higher speed, preferably during speech pauses. EP2876902A1 also deals with storing and replaying and proposes to provide means for marking (e.g. tagging or labelling) parts of a recorded sound to thereby ease a user's localization of the part of a conversation that is considered relevant.

SUMMARY

A Hearing Aid:

In an aspect of the present application, a hearing aid configured to be worn by a user is provided by the present disclosure. The hearing aid comprises
- an input transducer for providing an electric input signal representing an input sound;
- an output transducer for providing stimuli perceivable to the user as sound in dependence of said input sound or a processed version thereof;
- an audio signal forward path being defined from the input transducer to the output transducer.

The hearing aid further comprises
- an input buffer connected to the input transducer configured to store audio data representing one or more time segments of the electric input signal;
- an own voice detector for estimating whether or not, or with what probability, said input sound originates from the voice of the user at a given point in time, and providing an own voice control signal indicative thereof.

The audio signal forward path may comprise a combiner, allowing to insert audio data from said input buffer in said forward audio signal path, said inserted audio data being selected in dependence of an output control signal.

The hearing aid may comprise an input controller connected to the input buffer and adapted to receive the electric input signal or a signal derived therefrom. The input controller may be configured to control whether or not to store a time segment of the electric input signal in the input buffer at a given point in time in dependence of said own voice control signal.

The hearing aid may comprise an output controller connected to the input buffer and configured to select audio data from said one or more time segments of the electric input signal currently stored in the input buffer for insertion in the audio signal forward path at a given point in time in dependence of said output control signal.

The output control signal may originate from the user. Thereby an improved hearing aid may be provided.

The input transducer may comprise or be connected to an analogue to digital converter for providing the electric input signal as a digitized signal. The analogue signal is sampled with a sampling frequency $f_s$, e.g. in the range between 5 kHz and 50 kHz e.g. ≥20 kHz. The (digitized) electric input signal may represent a continuous stream of audio data (as provided by the input transducer). The continuous stream of audio data may e.g. comprise speech and non-speech, e.g. noise. The speech may originate from the user and/or from one or more additional sources. The 'one or more time segments' may be non-continuous (in the meaning that the 'more than one time segments' may be separated from each other in time, e.g. do not follow directly after each other in time, e.g. in that audio data originally present in the continuous audio data stream are left out (i.e. not stored in the input buffer), e.g. 'non-interesting parts', such as own-voice or noise).

The hearing aid may comprise a voice activity detector for estimating whether or not, or with what probability, said input sound comprises a voice signal at the given point in time, and providing a voice activity control signal indicative thereof; and wherein the input controller is configured to control whether or not to store the electric input signal in the input buffer at a given point in time in dependence of said voice activity control signal. Hence, the input controller may be configured to control whether or not to store the electric input signal in the input buffer at a given point in time in dependence of said voice activity control signal and said own voice control signal.

The input controller may be configured to store the electric input signal in the input buffer at a given point in time when said own voice control signal indicates an absence of the voice of the user, or the probability of its presence below a threshold value. The input signal need not be stored, when the user speaks, only when another person speaks. Thereby the input buffer at a given point in time only contains audio of potential interest to the user.

The input controller may be configured to store the electric input signal in the input buffer at a given point in time when said voice activity control signal indicates the presence of a voice signal, or the probability of its presence above a threshold value. Thereby, the hearing aid is configured to provide that the input buffer at a given point in time only contains audio spoken by another person in the environment of the user than the user him or herself (i.e. exclusive of audio spoken by the user and noise, where no voice is present (or where voice is present with a quality (e.g. SNR) below a threshold value for the voice activity detectors and/or below specific a speech presence probability, e.g. ≤50%).

The hearing aid may comprise a speech analyzer connected to the input buffer and configured to analyze at least one, such as all, of the one or more time segments of the electric input signal. The speech analyzer may be configured to analyze at least one (such as all) of the stored one or more time segments. The speech analyzer may be configured to identify speech elements stored in the input buffer in sub-sections, e.g. sub-sections containing linguistic elements (on a word or sentence basis) or sub-sections having a specific maximum length, etc. The speech analyzer may be configured to analyze the stored one or more time segments of the electric input signal in dependence of an (analyze) control signal, e.g. from a user interface. The speech analyzer may be configured to automatically analyze the stored one or more time segments of the electric input signal at a given point in time. The speech analyzer may form part of the output controller.

The speech analyzer may be configured to identify sub-sections of the audio data of the one or more time segments stored in the input buffer at a given point in time. The one or more time segments stored in the input buffer is assumed to have a (total) maximum length in time defined by the input buffer (and the sampling frequency of the input signal), e.g. less than 60 s, such as less than 40 s, or less than 20 s, or less than 10 s. For a given buffer length (in time), the one or more time segments presently stored in the input buffer may contain a number of sub-sections of varying of equal length in time, e.g. $<SN_{SS}>, \ldots, <S2>, <S1>$, where $N_{SS}$ is the (possibly time dependent) number of sub-sections currently stored in the input buffer at a given point in time, wherein $<SN_{SS}>$ and $<S1>$ are the first (oldest) and last (newest) stored sub-sections, respectively. The input buffer may be a cyclic buffer (e.g. a first-in, first-out buffer).

The hearing aid may comprise and/or be connectable to a user interface. The hearing aid may comprise the user interface. The hearing aid may be connectable to the user interface. The user interface may be (at least partially) implemented in an auxiliary device (separate from but connectable to (e.g. in communication with) the hearing aid). The auxiliary device may be a smartphone. The user interface may be at least partially implemented as an application adapted to be executed on a processor of the auxiliary device. The hearing aid and the user interface may be configured to allow the user to influence functionality of the hearing aid, e.g. including to initiate an analysis of the presently stored one or more time segments in the input buffer. The user interface may be configured to generate an (analyze) control signal for controlling the output controller (e.g. the speech analyzer) based on inputs from the user (e.g. for initiating the analysis, for selecting an order of replay, etc. The sub-section from which the 'replay' (presentation) should start may be indicated via the user interface.

The hearing aid may be configured to transfer information about the identified sub-sections to the user interface. The hearing aid (e.g. the speech analyzer) may be configured to transfer information about the identified sub-sections to an APP of an auxiliary device.

The output controller may be configured to select at least one of said sub-sections from the audio data of the input buffer for insertion in the audio signal forward path of the hearing aid in dependence of said output control signal. The output controller may be configured to select sub-sections of the one or more time segments stored in the input buffer in dependence of an input from the user via a user interface. The hearing aid may comprise or be connectable to the user interface. In other words, the hearing aid is configured to allow the output control signal to be generated via the user interface. A scheme for selecting the order of sub-sections from the input buffer by which they are inserted in the audio signal forward path and presented to the user may be determined via the user interface (e.g. 'new-to-old' (from the newest to the oldest) or 'old-to-new' (from the oldest to the newest). A specific one of the sub-sections' may be selected (e.g. by the user, e.g. via the user interface) among the multitude of sub-sections currently stored in the input buffer. The selected sub-section may be inserted in the audio signal forward path via the combiner. The output signal of the combiner may be either the selected sub-section(s) alone or a (possibly weighted) mixture of the selected sub-sections(s) and the signal of the audio signal forward path representing the current electric input signal from the input transducer. The hearing aid may comprise a signal processor. The signal processor may be configured to apply one or more processing algorithms to a signal of the audio signal forward path. The output signal of the combiner may be subject to processing (by a signal processor) according to the user's needs, e.g. hearing impairment. The (possibly processed) output signal of the combiner may be presented to the user via the output transducer.

The hearing aid may be configured to allow a user to select said sub-sections in a configurable order of appearance in the input buffer. 'A configurable order of appearance' is taken to mean that the order can be selected independent of the order of storage in the input buffer. The first selected sub-section may the latest stored (newest) sub-section, or it may be the first stored (oldest) sub-section, or it may start in the middle of the input buffer and go forward or backward in time (e.g. in a reverse order of appearance in the input buffer), etc. A 'reverse order of appearance' is taken to mean a reverse order of (time of) storage in the input buffer ($<SN_{SS}>, \ldots, <S2>, <S1>$), so that the 'first' ($<S1>$) sub-section is the latest stored (or newest) sub-section. The hearing aid, e.g. the output controller, may be configured to select successively older ('backwards in time') sub-sections, one at a time (in a 'rewind one sub-section at a time' mode of operation), e.g. to allow a user to search systematically (one at a time) for a given sub-section, from the newest to the oldest.

The hearing aid may be configured to allow an input from the user to the output controller to be received via the user interface as a written or spoken command.

The hearing aid may comprise a voice control interface. The user interface may comprise or be configured to interact with the voice control interface. The voice control interface may be configured to allow the user to influence the functionality of the hearing aid via one or more spoken commands. The hearing aid may comprise a keyword detector configured to recognize a number of predefined keywords, e.g. when spoken by the user. This may e.g. be achieved in dependence of the own voice detector and/or the voice activity detector.

The hearing aid may comprise a specific start word detector configured to initiate a storage mode of operation, when the start word is detected. The start word (or 'wake-word') detector may be configured to initiate the storage of the electric input signal in the input buffer (according to the present disclosure), when the start word is detected to be spoken by the user (e.g. in dependence of the own voice control signal). The hearing aid may comprise a specific stop word detector configured to terminate the storage mode of operation, when the stop word is detected (e.g. only when spoken by the user). The start word detector and/or the stop word detector may form part of a more general keyword detector.

Entry and/or termination of the 'storage mode of operation' of the hearing aid may be initiated via the user interface (be it voice controlled or not).

The sub-sections of the one or more time segments identified by the speech analyzer may be individual sentences. The speech analyzer may be configured to identify individual sentences in the one or more time segments stored in the input buffer. The speech analyzer may be configured to localize the beginning (and/or the end) of individual sentences in the one or more time segments stored in the input buffer. The beginning (or end) of a sentence may be identified by a pause in speech of a minimum duration, e.g. 10-50 ms, e.g. as detected by the voice activity detector. The speech analyzer may comprise an on-set detector configured to detect a start (or end) of a speech-element, e.g. a syllable, a word or a sentence. Sentence boundary detection may e.g. be performed using a hidden Markov models (HMM) framework, or other statistical approaches, e.g. maximum entropy models, cf. e.g. [Lieu et al.; 2006].

The speech analyzer may be configured to use statistical methods/models involving supervised learning, machine learning, artificial intelligence, etc. to identify sub-sections of the one or more time segments of the electric input signal stored in the input buffer.

The speech analyzer may comprise a neural network trained to identify individual sentences in an audio stream, e.g. in an audio stream comprising noisy speech. The neural network may be trained in an off-line procedure based on a large database of known sentences spoken by different persons in different noise environments. Optimized parameters (e.g. weights) of the trained neural network may be stored in the speech analyzer. Parameters of the neural network may be updated during use of the hearing aid in a particular learning mode, e.g. in cooperation with the user interface, e.g. implemented in an auxiliary device.

The output transducer may be configured to provide stimuli perceivable to the user as sound. The output transducer may comprise one or more of a loudspeaker, a vibrator or a multi-electrode array.

The hearing aid may comprise a replay controller for controlling the presenting of said one or more time segments or selected sub-sections thereof to the user via said output transducer. The replay controller may be configured to control a weighting of the stored signal from the input buffer and the current signal originating from the input transducer. The replay controller may be controlled via the user interface, e.g. via the output control signal.

The hearing aid may comprise an earpiece configured to be worn at or in an ear of the user, or to be partially implanted in the head at an ear of the user; the earpiece comprising
  said input transducer for providing an electric input signal representing an input sound;
  said output transducer for providing stimuli perceivable to the user as sound in dependence of said input sound or a processed version thereof.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output stage for providing a stimulus perceived by the user as an acoustic signal based on a processed electric signal. The output stage may comprise an output transducer. The output transducer may comprise a number of electrodes of a cochlear implant (for a CI type hearing aid) or a vibrator of a bone conducting hearing aid. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input stage for providing an electric input signal representing sound. The input stage may comprise an input transducer, e.g. a microphone, for converting an input sound to an electric input signal. The input stage may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in the literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The hearing aid may comprise antenna and transceiver circuitry (e.g. a wireless transmitter) for wirelessly transmitting an electric signal (e.g. a control signal, a status signal, an information signal, or an audio signal) to another device. The antenna and transceiver circuitry may be configured to allow reception as well as transmission of signals. The antenna and transceiver circuitry may be configured to allow establishment f a wireless link between the hearing aid and another device.

The wireless link may be established between two devices, e.g. between an entertainment device (e.g. a TV, or a smartphone, a tablet, etc.) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The modulation may be at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may have a maximum outer dimension of the order of 0.08 m (e.g. a headset). The hearing aid may have a maximum outer dimension of the order of 0.04 m (e.g. a hearing instrument).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, e.g. less than 20 g.

The hearing aid may comprise a forward or signal path between an input stage (e.g. an input transducer, such as a microphone or a microphone system and/or direct electric input (e.g. a wireless receiver)) and an output stage, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input stage, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. A signal of the forward and/or analysis path of the hearing aid may be split into a number of frequency bands (e.g. of uniform width), at least some of which are processed individually.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classifier configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classifier may be based on or comprise a neural network, e.g. a trained neural network.

The hearing aid may comprise an acoustic (and/or mechanical) feedback control (e.g. suppression) or echo-cancelling system. The feedback control system may comprise a feedback estimator for providing a feedback signal representative of an estimate of the acoustic feedback path, and a combiner, e.g. a subtractor, for subtracting the feedback signal from a signal of the forward path (e.g. as picked up by an input transducer of the hearing aid). The feedback estimator may comprise an update part comprising an adaptive algorithm and a variable filter part for filtering an input signal according to variable filter coefficients determined by said adaptive algorithm.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. The hearing aid or hearing aid system may comprise a speakerphone (comprising a number of input transducers and a number of output transducers, e.g. for use in an audio conference situation), e.g. comprising a beamformer filter, e.g. providing multiple beamforming capabilities.

Use:

In an aspect, use of a hearing aid as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid configured to be worn by a user at or in an ear of the user, is provided by the present disclosure. The hearing aid comprises an audio signal forward path from an input transducer to an output transducer. The method comprises providing by said input transducer an electric input signal representing an input sound;
providing by said output transducer stimuli perceivable to the user as sound in dependence of said input sound or a processed version thereof;
storing one or more time segments of the electric input signal;
estimating whether or not, or with what probability, said input sound originates from the voice of the user at the given point in time, and providing an own voice control signal indicative thereof.

The method may further comprise
controlling whether or not to store the electric input signal in the input buffer at a given point in time in dependence of said own voice control signal; and
selecting audio data from said one or more time segments of the electric input signal currently stored in the input buffer for insertion in the audio signal forward path at a given point in time in dependence of an output control signal, wherein said output control signal originates from the user; and
inserting said selected audio data in the audio signal forward path.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise storing the electric input signal in the input buffer at a given point in time when the said voice activity control signal indicate the presence of a voice signal and said own voice control signal indicates an absence of the voice of the user.

The method may further comprise
estimating whether or not, or with what probability, said input sound comprises a voice signal at the given point in time, and providing a voice activity control signal indicative thereof; and
controlling whether or not to store the electric input signal in the input buffer at a given point in time in dependence of said own voice control signal and said voice activity control signal.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The auxiliary device may be portable. The auxiliary device may be or comprise a cellular phone, e.g. a smartphone, or on another similar portable device allowing communication with said hearing aid, e.g. a smartwatch.

The hearing aid and the APP may be configured to allow a user to initiate (or terminate) a buffer mode (e.g. by clicking on an 'Initiate Buffer Mode' button on a GUI).

The hearing aid and the APP may be configured to allow a user to initiate a replay of stored audio data from the input buffer via the APP (e.g. order of replay, one sentence at a time, or full content, etc.).

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output stage for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output stage may comprise an output transducer, such as e.g. a loudspeaker for providing an air-borne acoustic signal or a vibrator for providing a structure-borne or liquid-borne acoustic signal. In some hearing aids, the output transducer may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as applications.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
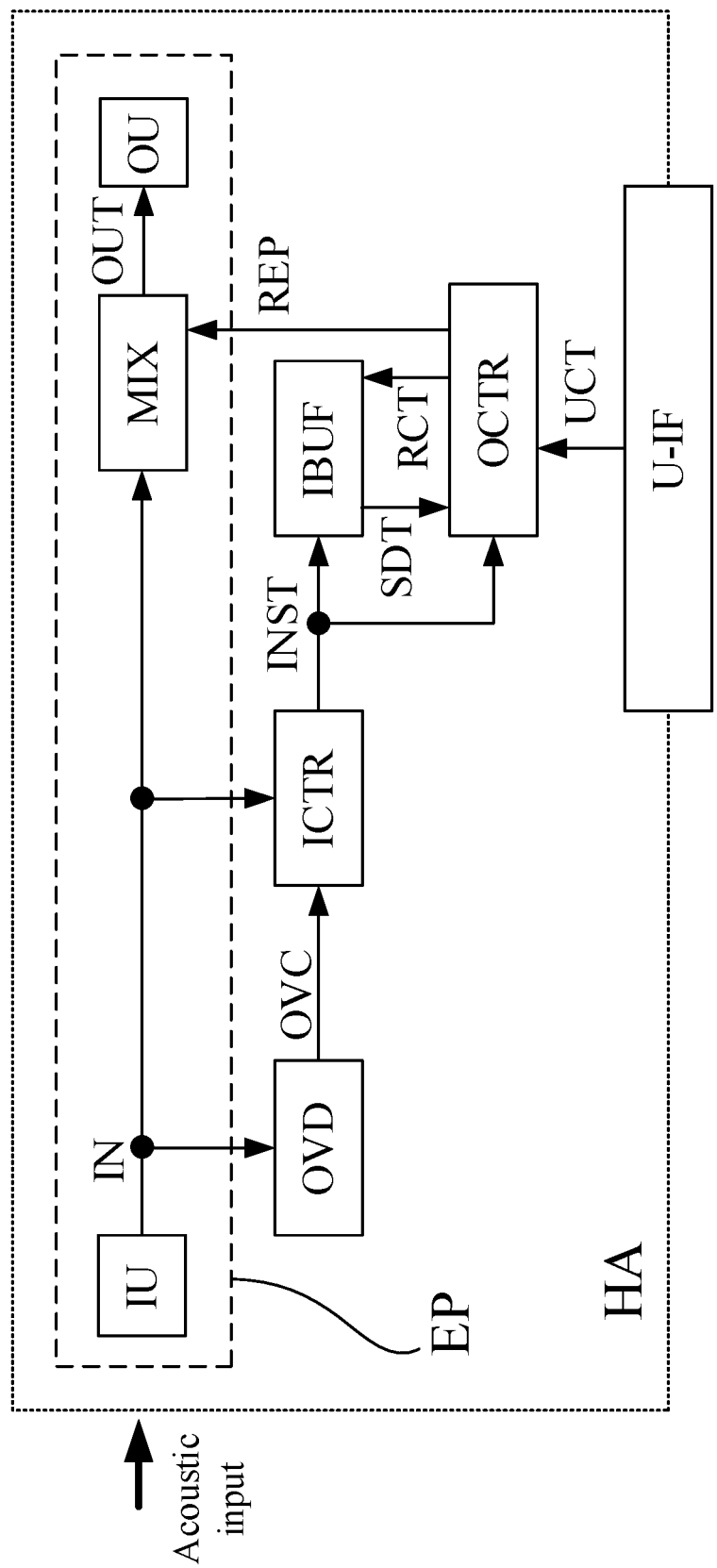
FIG. 1 shows a first embodiment of a hearing aid comprising a record and replay function according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to storage, analysis and replay of recently spoken words or sentences by a person in the hearing aid wearers acoustic environment. The present application relates specifically to store an input audio stream (or selected (qualified) parts thereof) in a (e.g. circular) buffer, e.g. in a compressed or processed form. Subject to (a e.g. user initiated) analysis of the present content of the buffer and a selection of relevant parts of the content based thereon, a presentation (playing) of the selected parts of the buffer to the user is initiated. In the present disclosure the term 'rewind' is used (inspired by old-time tape-recorders) to indicate the (selection and) presentation to the user of stored audio-segments from the input buffer.

One of the most wanted hearing aid features is "Rewind"—i.e. the function of enabling the hearing aid user to listen to the last few seconds of a sound again. This feature is known from streaming TV, where it is possible to skip back a fixed number of seconds. But rewinding a fixed number of seconds in the hearing aid risks to either be too much or too little:

Too much rewind may cause a period of unwanted silence (or noise) or uninteresting speech to be (re-)played before the wished-for audio is presented; and the hearing aid user is occupied by listening to unwanted audio.

Too little rewind may cause half a sequence to be replayed. The hearing aid user then risks not to get the meaning of the complete sentence, and at least need extra cognitive effort or a second rewind to be performed.

Both scenarios are annoyances, and half a sentence can be worse than nothing heard—e.g. "NO, don't eat the cake" may become "eat the cake".

The present disclosure proposes to detect the last sentence (or sentences) picked up by the hearing aid, and to replay this section of audio only. The 'smart rewind' can use other enhancements also, like noise filtering/removal, slower/faster playback speed, and/or removal of extended pauses.

Detection of a sentence can be done in various ways, e.g. by detecting speech pauses, or using artificial intelligence (AI) techniques to recognize sentences (e.g. using a data driven algorithm). As the rewind feature is not used continuously, it is feasible to use extra power and/or time in the hearing aid to improve its performance, both for sentence detection and to improve intelligibility.

During replay of audio from the input buffer, the re-played audio may be 'marked', to indicate to the user that this audio is not real-time. This can be done in several ways, among which:

Modifying the spectrum, making the voice more "metallic", or raise/lower the pitch (whatever works best for the users hearing loss).

Only replaying in the "good" ear (for a two-HI user).

Only replaying in the ear facing away from the speaker, giving an "I am repeating what she said" effect.

When replaying (perhaps in one ear), muting the input signal for this ear or both ears can help comprehension. After replaying and muting, the HI can catch up to real-time speech by playing the speech faster and/or removing pauses. Examples:

Detecting speech (e.g. sentences). Detecting "own voice" speech (e.g. sentences). Replaying only speech (e.g. sentences) to the user that that are not from "own voice".

As an alternative or further option, a fixed duration of the selected part of the audio data from the input buffer can be provided, e.g. selected via a user interface (i.e. an initiation of the rewind option results in a presentation to the user of the last (newest) part of the time segment stored in the input buffer).

Access to previous sentences, e.g. presented sentence-by-sentence, can be provided via the user interface.

The rewind feature may be configured to remove the user's own voice, as the user knows what (s)he said.

Further Examples:

The present feature is described in connection with a hearing aid but can also be used for a headset (e.g. a wireless (e.g. a Bluetooth) headset). As this is used for live phone conversations by normal-hearing users, the headset should do even more speed-up of the rewound audio, and also speed up the incoming audio after the rewind section, so the user hears all from the far end.

The present feature can also be used on streaming audio or TV, where currently a fixed duration is rewound.

The hearing aid and the user interface may be configured to allow a user to select replay of speech (e.g. words or sentences) not spoken by the user (i.e. voice activity is detected and stored, but not own-voice activity);

speech (e.g. words or sentences) from all voices (i.e. voice activity is detected);

all sound (including silence, and irrespective of voice activity or not);

or to allow the user be able to send the sound to another device, e.g. an auxiliary device, such as a smartphone, e.g. for playing for others or permanent storage.

A variety of method for identifying sentences in an audio data stream comprising speech are available. Example are e.g. provided by [Lieu et al.; 2006]. Sentence Boundary Identification can use any or all of these methods/features:

Silence.

Training to specific speakers' voices.

Filter out non-speech noise.

Identify (language-specific) sentence end-separators.

Rising pitch at the end of a question—as in English.

Accent on the sentence end.

Speaker separation—change of speaker.

Based on Direction to speaker.

Based on AI recognition of speaker.

Based on pitch/volume/spectral characteristics of speaker(s).

AI sentence border identification.

Where does a sentence usually end?

Applied to any speaker.

Applied to the Users' favorite speakers.

Identify (learn) what does a particular user (typically) need to have replayed? (training for this specific user makes it better and better).

Identify the speaker, and learn what the user typically wants replayed from this speaker.

I.e. when listening to the wife, the user wants to go two sentences back instead of just one.

Artificial Intelligence techniques, e.g. based on learning algorithms, e.g. using training on some or all of the above features could improve the effect—e.g. silence detection. Train on specific speaker, etc.

Training could also make the "smart rewind" work even smarter—e.g. by learning what the user typically needs to hear again, and replaying it automatically. This works well with "marking" the replay to avoid confusion.

"Smart rewind" can also be triggered by other user signals, among others:
- Gestures like "hand behind ear"—can be detected by the HI using eg capacitive sensing.
- Gestures like "cocking the head" or leaning forward "to hear better"—can be detected by a HI accelerometer.
- Gestures like "closing the eyes/blinking (twice)" or "frowning" or "wrinkling the nose"—can be detected by the HI measuring on muscle neural signals and/or EEG input.
- And of cause the user voice command ("OTICON: rewind")—perhaps softly spoken as not to interrupt the speaker.
- Or a voice command that is sub-vocalized, detected by HI measuring on muscle neural signals and/or EEG.

The hearing aid may be configured to remove any own-voice part of the stored audio. This may e.g. be used to compensate for the user not hearing the sentence to end, and start speaking over the first speaker.

FIG. 1 shows a first embodiment of a hearing aid comprising a record and replay function according to the present disclosure. The hearing aid (HA) is configured to be worn by a user, e.g. in or at an ear. The hearing aid comprises an input unit (IU) comprising an input transducer, e.g. a microphone, for providing an electric input signal (IN) representing an input sound (Acoustic input), e. from the environment of the user. The hearing aid further comprises an output unit (OU) comprising an output transducer for providing stimuli perceivable to the user as sound in dependence of said input sound or a processed (e.g. delayed) version thereof. An audio signal forward path is defined from the input transducer to the output transducer. The hearing aid further comprises an input buffer (IBUF) connected to the input transducer (IU) and configured to store audio data representing one or more time segments of the electric input signal (IN). The hearing aid further comprises an own voice detector (OVD) for estimating whether or not, or with what probability, the input sound originates from the voice of the user at a given point in time and providing an own voice control signal (OVC) indicative thereof. The audio signal forward path comprises a combiner (MIX) (in FIG. 1 connected to an output of the input transducer and) connected to an output of the input buffer (IBUF). The combiner is configured insert audio data (REP) from the input buffer in the forward audio signal path. The inserted audio data are selected from the input buffer (IBUF) in dependence of an output control signal (RCT). The hearing aid further comprises an input controller (ICTR) connected to the input buffer (IBUF) (cf. signal INST). The input controller is adapted to receive the electric input signal (IN) or a signal derived therefrom. The input controller (ICTR) is configured to control whether or not to store a time segment of the electric input signal (IN) in the input buffer (IBUF) at a given point in time in dependence of the own voice control signal (OVC). The hearing aid further comprises an output controller (OCTR) connected to the input buffer (IBUF) and configured to select audio data (SDT) from said one or more time segments of the electric input signal (INST) currently stored in the input buffer (IBUF) for insertion in the forward path at a given point in time in dependence of the output control signal (RCT). The output control signal (RCT) is provided by the output controller (OCTR), which receives a user input (UCT) from a user (communication) interface (U-IF). The output control signal (RCT) may thus be influenced or originate from the user (via signal UCT). In response to the output control signal (RCT) the output controller retrieves the selected audio data (SDT) from the input buffer (IBUF) and forwards such data (REP) for replay to the user via the combiner (MIX). The output signal (OUT) of the combiner (MIX) may be either the selected audio data (e.g. sub-sections thereof) (REP) alone, or a (possibly weighted) mixture of the selected audio data (REP) and the signal (IN) of the forward path representing the current electric input signal from the input transducer (IU). The hearing aid (HA) may comprise a signal processor (not shown, see e.g. FIG. 2), e.g. inserted after the combiner, e.g. to apply appropriate processing algorithms (e.g. compressive amplification) to the signal of the forward path to compensate for a hearing impairment of the user. The (possibly processed) output signal of the combiner may be presented to the user via the output transducer (OU).

The input buffer (IBUF) may be configured to store audio data corresponding to a maximum length in time (e.g. in dependence of the sampling frequency of the input signal), e.g. less than 120 s or less than 60 s. The one or more time segments stored in the input buffer at a given point in time may contain a number of sub-sections (typically of varying length in time), e.g. $<SN_{SS}>, \ldots, <S2>, <S1>$, where $N_{SS}$ is the (possibly time dependent) number of sub-sections currently stored in the input buffer at a given point in time, wherein $<SN_{SS}>$ and $<S1>$ are the first (oldest) and last (newest) stored sub-sections, respectively. The input buffer may be a cyclic buffer (e.g. a first-in, first-out buffer).

The input buffer (IBUF) may be or implement a cyclic buffer of a specific length, so that audio data older than corresponding to a specific length in time ($T_{buf}$) are lost (substituted by new (current) audio data), when the buffer is full.

The hearing aid (and possibly the user interface) may be configured to only store and/or analyze data in the input buffer when the hearing aid is in a specific 'buffer mode' of operation.

A time segment may be stored in the input buffer as a time domain signal (waveform) or as a frequency domain signal (e.g. in a time-frequency representation, e.g. being the result of a Fourier transformation) (in the latter case an appropriate filter bank must be provided).

The input unit (IU) may comprise one or more input transducers. The input unit may comprise one or more analogue to digital converters, as appropriate. The input unit may comprise one or more analysis filter banks, as appropriate. The input unit may comprise a beamformer providing a spatially filtered signal as a linear combination of a multitude of electric input signals from a multitude of input transducers (see e.g. BF in FIG. 7)

Figure 3:
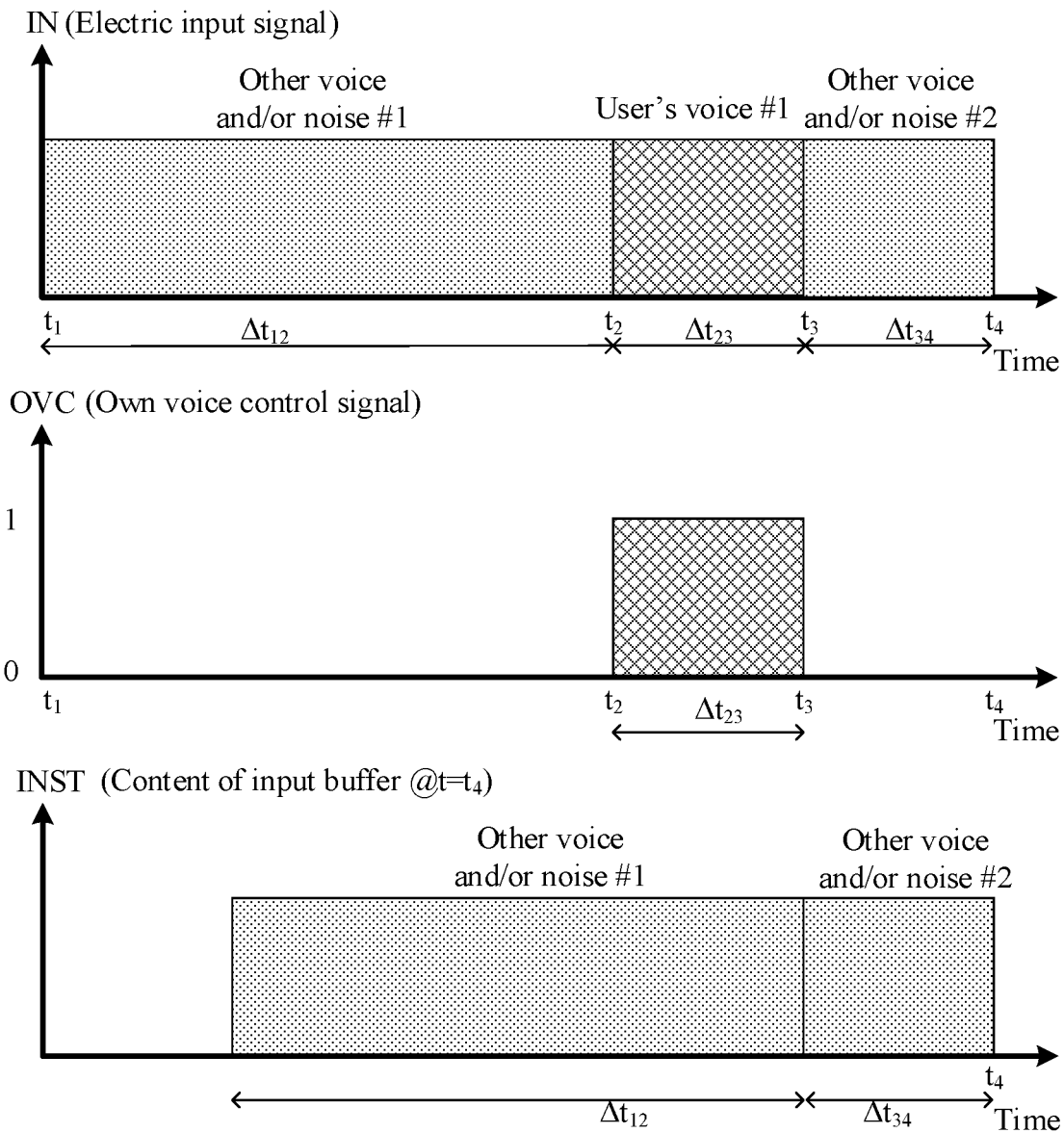
FIG. 3 shows a first example of corresponding time periods of an electric input signal (top) of a hearing aid, an own voice control signal (middle), and contents of an input buffer (bottom) according to the present disclosure.

The input controller (ICTR) may be configured to store the electric input signal (IN) in the input buffer (IBUF) at a given point in time when the own voice control signal indicates an absence of the voice of the user, or the probability of its presence below a threshold value. An example is shown in FIG. 3.

The user interface may be at least partially implemented in an auxiliary device, e.g. as an APP. The part of the user interface located in the hearing aid (U-IF) may e.g. comprise a communication interface (e.g. antenna and transceiver circuitry) to the auxiliary device (see e.g. FIG. 6, 7). The hearing aid and the auxiliary device (or a part thereof) may form part of a hearing aid system.

Figure 2:
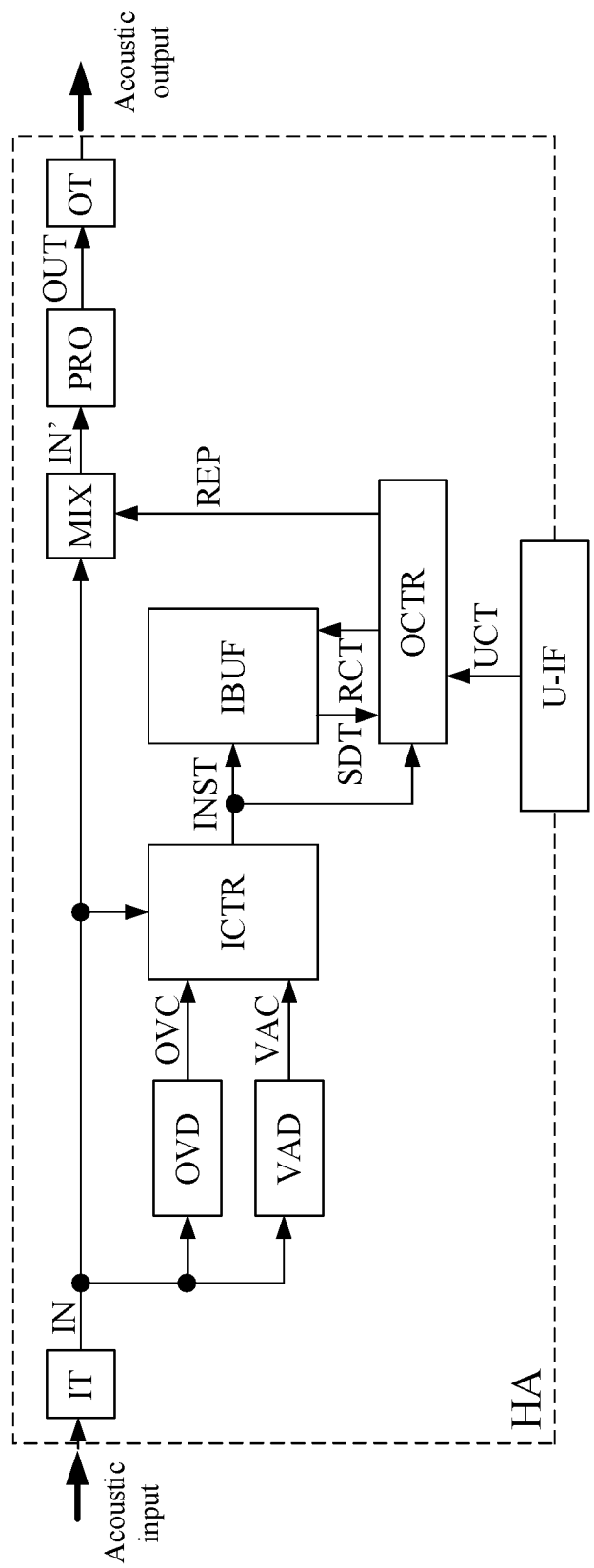
FIG. 2 shows a second embodiment of a hearing aid comprising a record and replay function according to the present disclosure.

FIG. 2 shows a second embodiment of a hearing aid comprising a record and replay function according to the present disclosure. The embodiment of the hearing aid of FIG. 2 comprises the same elements as the embodiment of FIG. 1. In the hearing aid (HA) of FIG. 2, the input unit (IU) of FIG. 1 comprises an input transducer (IT), e.g. a microphone. Similarly, the output unit (OU) of FIG. 1 comprises an output transducer (OT), e.g. a loudspeaker, a vibrator or a multi-electrode. The hearing aid (HA) may additionally comprise a signal processor (PRO). The signal processor (PRO) may be configured to apply one or more processing algorithms to a signal of the forward path. The output signal (IN') of the combiner (MIX) may be subject to processing by the signal processor (PRO) according to the user's needs, e.g. a hearing impairment. The (possibly processed) output signal (IN', (OUT)) of the combiner is presented to the user via the output transducer (OT).

The hearing aid (HA) of FIG. 2 additionally comprises a voice activity detector (VAD) for estimating whether or not, or with what probability, said input sound comprises a voice signal at the given point in time, and providing a voice activity control signal (VAC) indicative thereof. The input controller (ICTR) is configured to control whether or not to store the electric input signal (IN) in the input buffer (IBUF) at a given point in time in dependence of the voice activity control signal (VAC) and the own voice control signal (OVC). The output signal (INST) of the input controller (ICTR) contains the time segment of the input data stream (IN) that are selected for storage in dependence of the control signals (OVC, VAC) at a given point in time. Specifically, the input controller (ICTR) may be configured to store the electric input signal in the input buffer (IBUF) at a given point in time when the own voice control signal (OVC) indicates an absence of the voice of the user, or the probability of its presence below a threshold value ($OVC_{th}$), and when the voice activity control signal (VAC) simultaneously indicates the presence of a voice signal, or the probability of its presence above a threshold value ($VAC_{th}$). Thereby, the input buffer (ICTR) (at a given point in time) only contains audio spoken by another person in the environment of the user than the user him or herself (i.e. exclusive of audio spoken by the user and noise (noise being defined when no voice is present (or where voice is present with a quality (e.g. SNR) below a threshold value for the voice activity detectors and/or below specific a speech presence probability, e.g. ≤50%). An example is shown in FIG. 4.

The selected audio data (e.g. sub-section(s)) may be inserted in the forward path via the combiner (MIX). The output signal (IN') of the combiner may be either the selected sub-section(s) (REP) from the input puffer (IBUF) alone, or a (possibly weighted) mixture of the selected sub-sections(s) and the signal (IN) of the forward path representing the current electric input signal from the input transducer (IT). The mutual weighting of the two inputs to the combiner (MIX) may be fixed, or controlled by the output controller, e.g. via an input from the user interface, see e.g. FIG. 7.

FIG. 3 shows a first example of corresponding time periods of an electric input signal (top) of a hearing aid, an own voice control signal (middle), and contents of an input buffer (bottom) according to the present disclosure. The top graph of FIG. 3 schematically illustrates a time period reflecting the contents of a sound input to the hearing aid (represented by the electric input signal, see e.g. IN in FIG. 1, 2). Between time $t_2$ and $t_3$ (time range $\Delta t_{23}$), the user's voice is detected to be present (indication 'User's voice #1') as detected by an own voice detector, see middle graph (denoted 'OVC (Own voice control signal)' vs. 'Time', the OVC taking on values between 0 and 1, here shown as binary). Between time $t_1$ and $t_2$ and between time $t_3$ and $t_4$ (i.e. in time ranges $\Delta t_{12}$ and $\Delta t_{34}$, respectively), the user's voice is detected to be present (indication 'User's voice #1') (e.g. as concluded by the own voice detector indicating that the user's voice is NOT detected in these time periods). The bottom graph schematically illustrates the contents of the input buffer in case the input controller only depends on the own voice control signal (OVC), as illustrated in FIG. 1. The stored time segments are segments 'Other voice and/or noise #1' ($\Delta t_{12}$) and '#2' ($\Delta t_{34}$), i.e. excluding the time segment containing the user's own voice. Thereby, more relevant data can be stored in a buffer of fixed length, Further, processing power can be saved by neglecting uninteresting data in analysis/processing steps.

Figure 4:
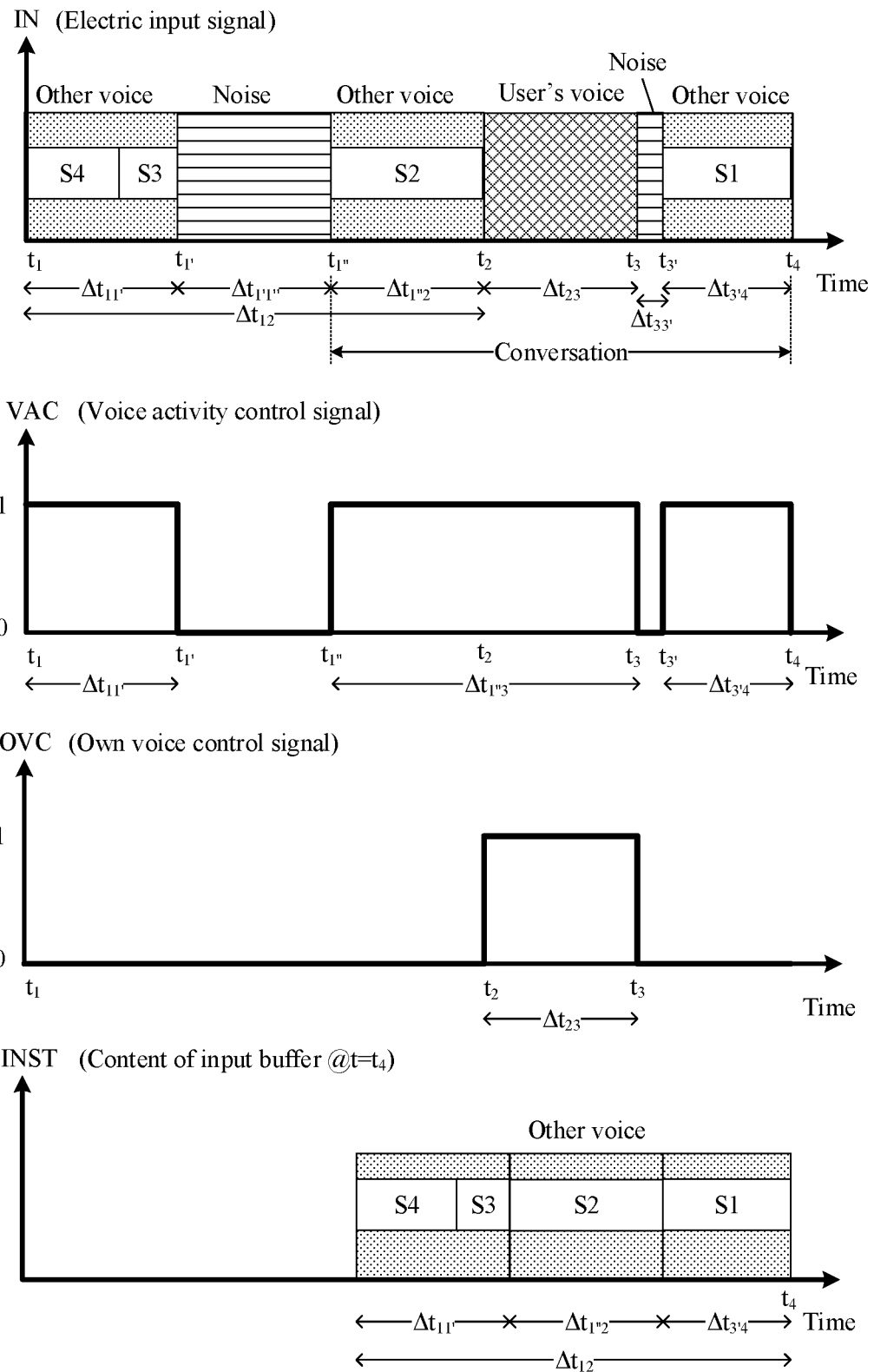
FIG. 4 shows a second example of corresponding time periods of an electric input signal (top) of a hearing aid, a voice activity control signal ($2^{nd}$ from top), an own voice control signal ($2^{nd}$ from bottom), and contents of an input buffer (bottom) according to the present disclosure, indicating sub-sections of the stored time segments containing speech.

FIG. 4 shows a second example of corresponding time periods of an electric input signal (top) of a hearing aid, a voice activity control signal ($2^{nd}$ from top), an own voice control signal ($2^{nd}$ from bottom), and contents of an input buffer (bottom) according to the present disclosure, indicating sub-sections of the stored time segments containing speech. The graph has a similar scope as FIG. 3 but further comprises a voice activity control signal 'VAC (Voice activity control signal)' in the $2^{nd}$ graph from the top. By combining the own voice control and the voice activity control signals (OVC and VAD), as illustrated in FIGS. 2 (and 7), a more detailed analysis of the contents of the electric input signal IN can be made. This is reflected in the top graph of FIG. 4 comprising time segments denoted 'Other voice' (time segments $\Delta t_{1'1'}$, $\Delta t_{1''2}$, $\Delta t_{3'4}$), 'Noise' (time segments $\Delta t_{1'1''}$, $\Delta t_{33'}$), and 'User's voice' (time segment $\Delta t_{23}$). The more detailed classification of the acoustic environment is reflected in the values of the VAC and OVC signals in the two middle graphs. The bottom graph schematically illustrates the contents of the input buffer in case the input controller depends on the own voice control signal (OVC) as well as the (general) voice activity control signal (VAC). The stored time segments are only segments 'Other voice ($\Delta t_{11'}$, $\Delta t_{1''2}$, and $\Delta t_{3'4}$) i.e. excluding the time segment containing the user's own voice and noise (no voice). Thereby, even only potentially relevant data are stored in a more compact way (extending over $\Delta t_{sum}$). In the stored time segments of 'Other voice' an indication of sub-sections, each containing a sentence 'Sn', are indicated (cf. rectangles denoted S1, S2, S3, S4). The classification may allow the differentiation of a user participating in a conversation (as indicated by the double arrow 'Conversation' in the right part of the top graph) or is in a more passive, possibly listening, role, e.g. corresponding to the left part of the top graph.

Figure 5:
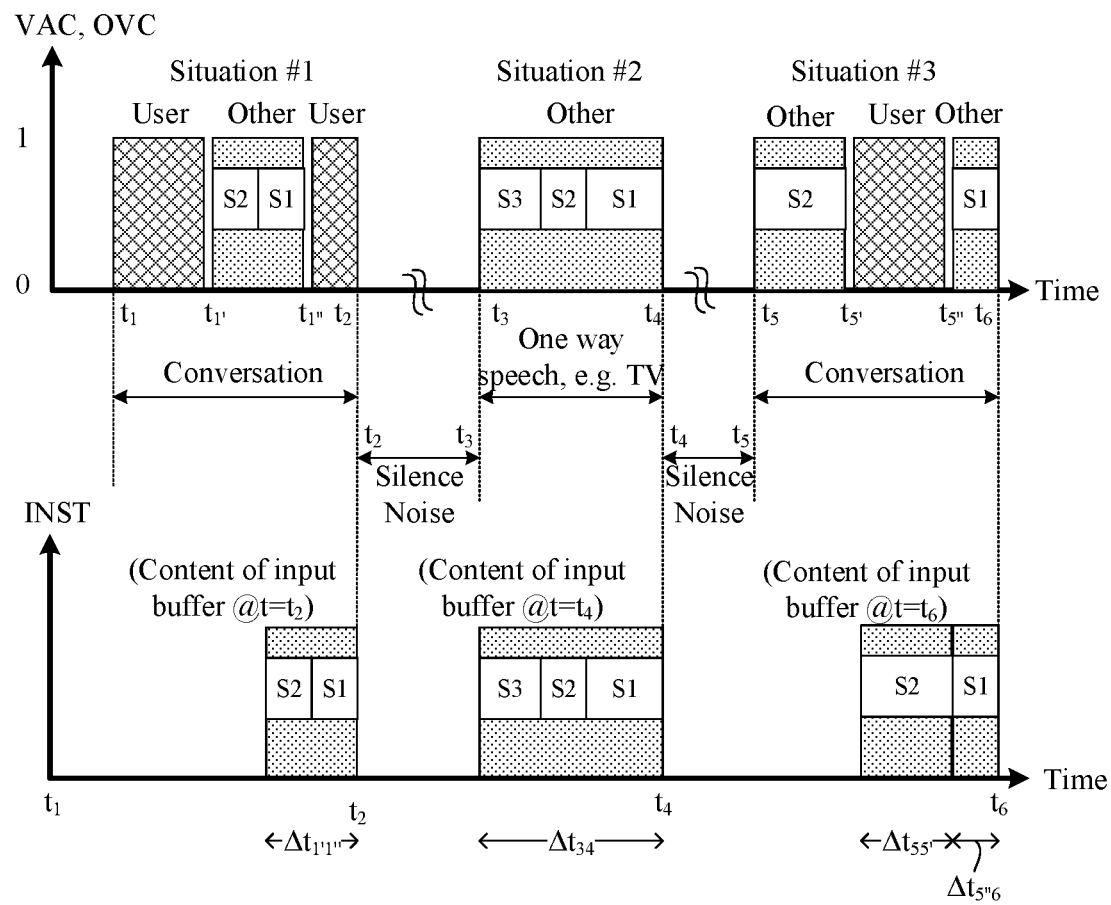
FIG. 5 shows an example of three different time periods of a voice activity control signal and an own voice control signal, each representing a different acoustic situation (top), and corresponding contents of an input buffer (bottom) according to the present disclosure, indicating sub-sections of the stored time segments containing speech.

FIG. 5 shows an example of three different time periods of a voice activity control signal (VAC) and an own voice control signal (OVC), each representing a different acoustic situation (top), and corresponding contents of an input buffer (bottom) according to the present disclosure, indicating sub-sections of the stored time segments containing speech. The voice detector control signals VAC, OVC are exemplified as taking on values between 0 and 1, here shown as binary (0 or 1). The first and third situations (denoted 'Situation #1' and 'Situation #3', respectively) illustrated by the 'processed' values of two voice control signals of the top graph are interpreted as conversations (e.g. concluded when the voice of the user and another user are essentially non-overlapping and following alternatingly (closely) after another). The middle situation (denoted 'Situation #2', 'Other') in the top graph, where a voice is detected (but not the user's voice) reflects a situation of 'One-way speech, e.g. TV'. Between the three illustrated situations 'Silence' or 'Noise' is indicated (in time ranges $t_2$-$t_3$ and $t_4$-$t_5$, respectively). The bottom graph schematically illustrates the contents of the input buffer (IBUF) at the end of the three situations (at times $t_2$, $t_4$, and $t_6$, respectively). As in FIG. 4, each of the stored time segments of 'Other voice' in the three situation include an indication of sub-sections, each containing a sentence 'Sn' (cf. rectangles denoted (S1, S2), (S1, S2, S3) and (S1, S2), respectively).

Figure 6:
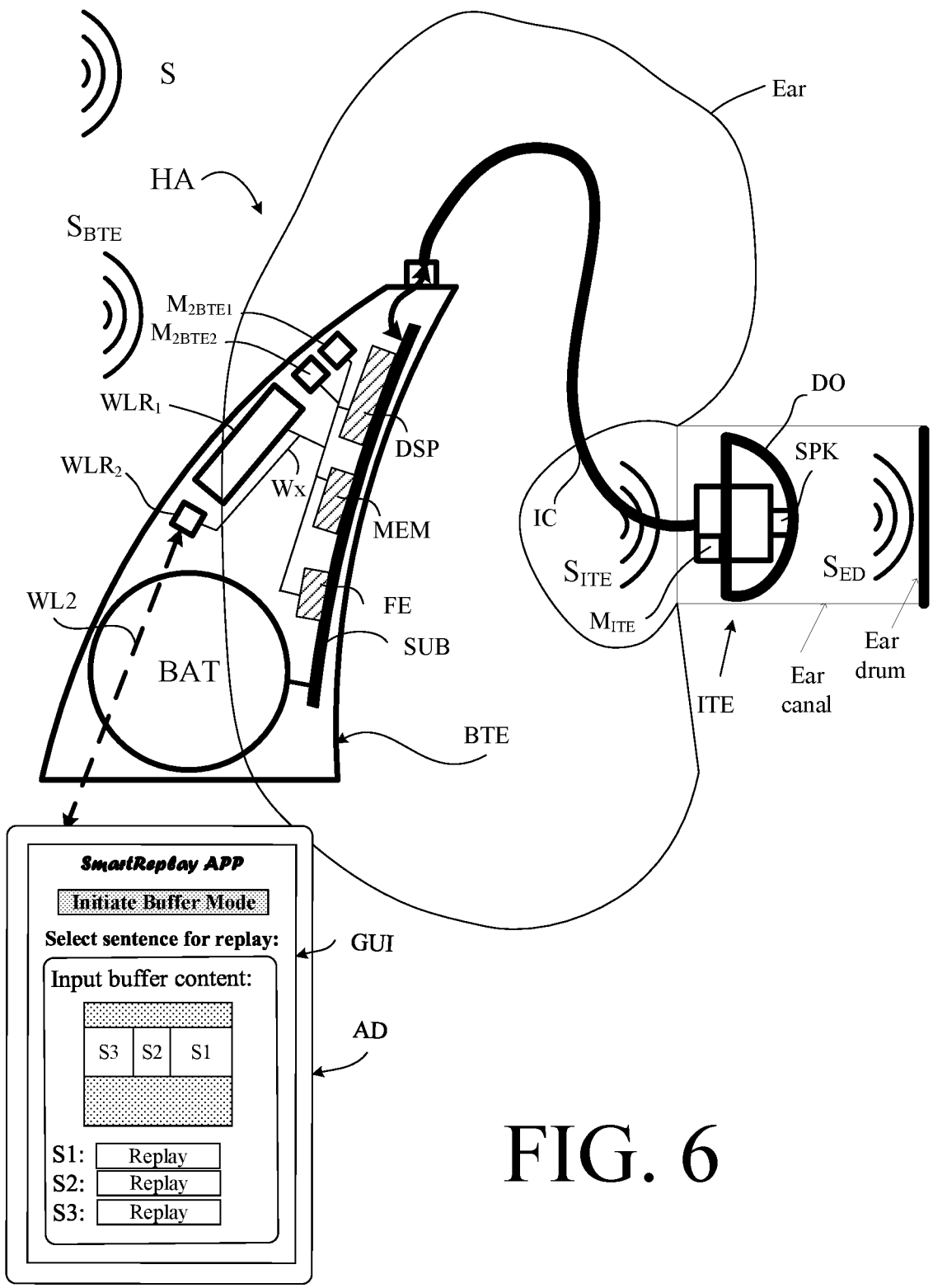
FIG. 6 shows an embodiment of a hearing aid according to the present disclosure comprising a BTE-part located behind an ear or a user and an ITE part located in an ear canal of the user, and an auxiliary device implementing at least a part of a user interface for the hearing aid.

FIG. 6 shows an embodiment of a hearing aid (HA) according to the present disclosure, and an auxiliary device (AD) implementing at least a part of a user interface (Up for the hearing aid. The hearing aid (HA) and the auxiliary device (AD) are configured to allow communication between them. Together, the hearing aid (HA) and the auxiliary device (AD) may constitute a hearing aid system according to the present disclosure.

FIG. 6 illustrates an exemplary hearing aid (HA) formed as a receiver in the ear (RITE) type hearing aid comprising a BTE-part (BTE) adapted for being located behind pinna and a part (ITE) comprising an output transducer (OT, e.g. a loudspeaker/receiver) adapted for being located in an ear canal (Ear canal) of the user (e.g. exemplifying a hearing aid (HA) as shown in FIG. 1, 2). The BTE-part (BTE) and the ITE-part (ITE) are connected (e.g. electrically connected, e.g. via a cable comprising a multitude of conductors, e.g. three or more, such as six or more) by a connecting element (IC). In the embodiment of a hearing aid of FIG. 6, the BTE part (BTE) comprises two input transducers (here microphones) ($M_{BTE1}$, $M_{BTE2}$) each for providing an electric input audio signal representative of an input sound signal ($S_{BTE}$) from the environment (in the scenario of FIG. 6, from sound source S, e.g. a communication partner). The hearing aid (HA) of FIG. 6 further comprises two wireless transceivers ($WLR_1$, $WLR_2$) for receiving and/or transmitting signals (e.g. comprising audio and/or information, e.g. buffered data according to the present disclosure). The hearing aid (HA) further comprises a substrate (SUB) whereon a number of electronic components are mounted, functionally partitioned according to the application in question (analogue, digital, passive components, etc.), but including a configurable digital signal processor (DSP), a front-end chip (FE), and a memory unit (MEM), e.g. including the input buffer (IBUF), coupled to each other and to input and output units via electrical conductors Wx. The mentioned functional units (as well as other components) may be partitioned in circuits and components according to the application in question (e.g. with a view to size, power consumption, analogue vs digital processing, etc.), e.g. integrated in one or more integrated circuits, or as a combination of one or more integrated circuits and one or more separate electronic components (e.g. inductor, capacitor, etc.). The configurable signal processor (DSP), e.g. comprising processor PRO in FIG. 2, provides an enhanced audio signal (cf. signal OUT in FIG. 2), which is intended to be presented to a user. The front-end integrated circuit (FE) is adapted for providing an interface between the configurable signal processor (DSP) and the input and output transducers, etc., and typically comprises interfaces between analogue and digital signals. The input and output transducers (e.g. IT and OT in FIG. 2) may be individual separate components, or integrated (e.g. MEMS-based) with other electronic circuitry. In the embodiment of a hearing aid in FIG. 6, the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). The ITE-part further comprises an input unit comprising an input transducer (e.g. a microphone) ($M_{ITE}$) for providing an electric input audio signal representative of an input sound signal SITE from the environment at or in the ear canal (e.g. facing the environment to utilize the acoustic advantages of pinna, or e.g. facing the eardrum to estimate a sound pressure level, to measure feedback, or to monitor directly propagated sound from the environment, to estimate own voice, etc.). In another embodiment, the hearing aid may comprise only the BTE-microphones ($M_{BTE1}$, $M_{BTE2}$). In yet another embodiment, the hearing aid may comprise an input unit located elsewhere than at the ear canal in combination with one or more input units located in the BTE-part and/or the ITE-part. The ITE-part further comprises a guiding element, e.g. a dome, (DO) for guiding and positioning the ITE-part in the ear canal of the user.

The hearing aid (HA) exemplified in FIG. 6 is a portable device and further comprises a battery (BAT) for energizing electronic components of the BTE- and ITE-parts.

The hearing aid (HA) may comprise a directional microphone system (e.g. a beamformer filter) adapted to enhance a target acoustic source among a multitude of acoustic sources in the local environment of the user wearing the hearing aid. The electric input signal (IN, in FIG. 1. 2) may be a beamformed signal formed as a linear combination of two or more input transducers (e.g. microphones, e.g. $M_{BTE1}$ and $M_{BTE2}$, and possibly $M_{ITE}$, in FIG. 6).

The hearing aid may comprise a number of sensors or detectors for detecting properties f the user or the environment. Exemplary sensors may be a movement sensor (e.g. an accelerometer), a PPG-sensor, electric potential sensors for capturing body signals, etc.

The memory unit (MEM) may form part of or include the input buffer (IBUF) and comprise stored audio data according to the present disclosure.

The hearing aid of FIG. 6 may constitute or form part of a binaural hearing aid system according to the present disclosure.

The hearing aid (HA) according to the present disclosure may comprise or form part of a user interface UI, e.g. as shown in the bottom part of FIG. 6 implemented in an auxiliary device (AD), e.g. a remote control, e.g. implemented as an APP in a smartphone or other portable electronic device. In the embodiment of FIG. 6, the screen (GUI) of the user interface illustrates a SmartReplay APP. The user may initiate (or terminate) a buffer mode by clicking on the 'Initiate Buffer Mode' button. Similarly, the user may configure the replay of stored audio data from the input buffer via the APP (e.g. order of replay, one sentence at a time, or full content, etc.). Further, the user may be allowed to control the degree of mixing with the 'normal current content' of the forward path via the user interface, e.g. by modifying weights applied to of the two data streams entering the combiner ((MIX) in FIG. 1, 2) In the lower (main) frame of the screen a current content of the input buffer is schematically indicated as sentences S1 (newest), S2, S3 (oldest). The user may e.g. select a sentence among the current content of the input buffer (S1, S2, S3) for replay by clicking on the corresponding 'Replay button'. A click on the Replay button at S1 initiates the replay of sentence S1 (insertion in the forward path via combiner (MIX) in FIG. 1, 2 (possible processing) and presentation via the output unit/transducer (OU/OT)). Correspondingly, a click on the Replay button at S2 initiates the replay of sentence S2 (possibly automatically followed by sentence S1). Correspondingly, a click on the Replay button at S3 initiates the replay of sentence S3 (possibly automatically followed by sentence S2, and S1). Alternatively (or additionally), the APP may be configured to only use one replay button and an option of selecting an order of replay, e.g. 'newest-to-oldest' (N2O) or 'oldest-to-newest (O2N), e.g. in that the user clicks on S1 (or a dedicated 'N2O button') for the order 'newest-to-oldest' or button S3 (or a dedicated 'O2N button') for the order 'oldest-to-newest'. Having selected an order of replay, the user my click on the reply button and start the replay in the selected order. The user interface may be configured to play all stored sentences, one after the other, in the selected order, or to let the user select replay of one at a time (so that the user can 'click through the contents of the input buffer, one sentence at a time, in the selected order).

The auxiliary device (AD) and the hearing aid (HA) are adapted to allow communication of data related to the storage, control, selection, display, and replay of audio data from the input buffer via a, e.g. wireless, communication link (cf. dashed arrow WL2 in FIG. 6). The communication link WL2 may e.g. be based on far field communication, e.g. Bluetooth or Bluetooth Low Energy (or similar technology), implemented by appropriate antenna and transceiver circuitry in the hearing aid (HA) and the auxiliary device (AD), indicated by transceiver WLR$_2$ in the hearing aid. The transceiver WLR$_2$ may form part of the user interface (cf. U-IF in FIG. 1, 2).

Figure 7:
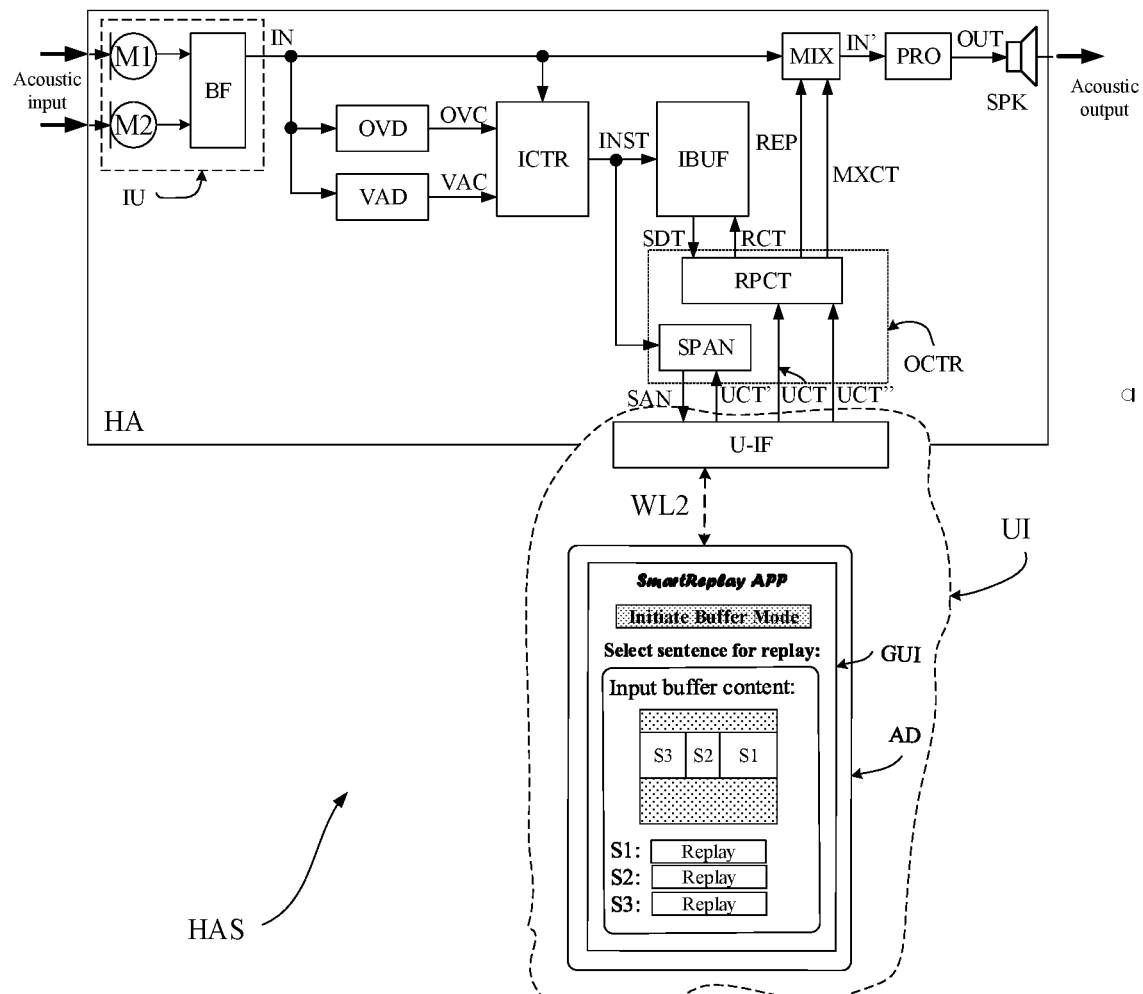
FIG. 7 shows a third embodiment of a hearing aid comprising a record and replay function according to the present disclosure and an auxiliary device implementing at least a part of a user interface for the hearing aid.

FIG. 7 shows a third embodiment of a hearing aid comprising a record and replay function according to the present disclosure in combination with an auxiliary device implementing at least a part of a user interface for the hearing aid. The hearing aid (HA) and (at least a part of) the auxiliary device (AD) may together constitute a hearing aid system (HAS) according to the present disclosure. The auxiliary device (AD) and the part of the user interface (UI) it implements may be implemented as described in connection with FIG. 6. The hearing aid (HA) of FIG. 7 comprises the same elements as described in connection with FIG. 2, the output controller (OCTR) is shown in further detail, though. Likewise, the input unit (IU) is shown to contain two microphones (M1, M2) and a beamformer (BF) providing a spatially filtered signal (IN) as a linear combination (possibly using complex, frequency dependent weights) of the microphone signals. The spatially filtered (beamformed) signal (IN) of the embodiment represents 'the electric input signal' (IN) referred to elsewhere in the present disclosure.

The output controller (OCTR) comprises a speech analyzer (SPAN) configured to identify speech elements stored in the input buffer (IBUF) (represented by input signal INST) in sub-sections. In this case sub-sections containing basic linguistic elements in the form of sentences are identified (as indicated in the graphical user interphase (GUI) of the SmartReplay APP' of the auxiliary device (AD) as sentences S1, S2, S3, cf. also FIG. 4, 5). The speech analyzer (SPAN) may be configured to analyze the stored audio data (INST) of the one or more time segments of the electric input signal (IN) in dependence of an (analyze) control signal (UCT'), e.g. from the user interface (UI). The speech analyzer (SPAN) may alternatively be configured to automatically analyze the stored audio data.

The speech analyzer may be configured to identify individual sentences in the one or more time segments stored in the input buffer. The speech analyzer may be configured to localize the beginning (and/or the end) of individual sentences in the one or more time segments stored in the input buffer. The beginning (or end) of a sentence may be identified by a pause in speech of a minimum duration. The speech analyzer may comprise an on-set detector configured to detect a start (or end) of a speech-element, e.g. a syllable, a word or a sentence. Sentence boundary detection may e.g. be performed using a hidden Markov models (HMM) framework, or other statistical approaches, e.g. maximum entropy models, cf. e.g. [Lieu et al.; 2006]. The speech analyzer may be configured to use statistical methods/models involving supervised learning, machine learning, artificial intelligence, etc. to identify sub-sections of the one or more time segments of the electric input signal stored in the input buffer. The speech analyzer may comprise a neural network trained to identify individual sentences in an audio stream, e.g. in an audio stream comprising noisy speech. Parameters of the neural network may be updated during use of the hearing aid in a particular learning mode, e.g. in cooperation with the user interface, e.g. implemented in an auxiliary device.

The hearing aid (specifically the output controller (OCTR)) of FIG. 7 further comprises a replay controller (RPCT) for controlling the presentation of the selected audio data (sub-sections, sentences) from the one or more time segments stored in the input buffer to the user via the output transducer (here loudspeaker SPK). The replay controller (RPCT) provides the replay control signal (RCT) to the input buffer (IBUF) in dependence of a user control signal (UCT) from the user interface, receives the selected audio data (sub-sections, SDT) in response, and provides the selected sub-sections for presentation to the user (cf. signal REP).

The replay controller (RPCT) may be configured to control a weighting (cf. signal MXCT to the combiner (MIX)) of the selected signal from the input buffer (REP) and the current signal (IN) originating from the input transducer(s). The replay controller may be controlled vi the user interface, e.g. via the output control signal (UCT").

The user interface (UI) is indicated in FIG. 7 by the dashed curved enclosure. The user interface (UI) comprises antenna and transceiver circuitry in the hearing aid (HA) (included in communication interface (U-IF)) and in the auxiliary device (not shown). The hearing aid and the auxiliary device are configured to establish a wireless communications link (WL2) between them (cf. dashed double arrow between the two units). The user interface (UI) further comprises the application software (APP) comprising instructions configured to run on a processor of the particular auxiliary device (AD) to handle the exchange of data between the hearing aid and the user, including to present data to the user and to receive inputs from the user via a graphical interface (GUI) and forward such inputs to the hearing aid (e.g. to the output controller OCTR).

As illustrated in the lower part of FIG. 7, a specific one of the sub-sections' (e.g. S1) may be selected by the user via the graphical user interface of the auxiliary device (AD) among the multitude of sub-sections (S1, S2, S3) currently stored in the input buffer (IBUF). The selection in the APP creates control signal UCT transmitted from the auxiliary device (AD) to the hearing aid (HA) and received by antenna and transceiver circuitry (U-IF) of the hearing aid and forwarded to the output controller (OCTR), specifically the replay controller (RPCT).

Instead of (or in addition to) the user interface implemented in cooperation with the auxiliary device, a voice control interface configured to receive spoken commands may fully or partially implement the user interface. The voice control interface may be implemented in the hearing aid, or in the auxiliary device, or partially in the hearing aid and in the auxiliary device.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

U.S. Pat. No. 8,300,861B2 (Oticon) 3 Jun. 2010
EP2876902A1 (Oticon) 27 May 2015
[Lieu et al.; 2006] Yang Liu, Elizabeth Shriberg, Andreas Stolcke, Dustin Hillard, Mari Ostendorf, Mary Harper, Enriching Speech Recognition with Automatic Detection of Sentence Boundaries and Disfluencies, IEEE TRANSACTIONS ON SPEECH & AUDIO PROCESSING, volume 14, issue 5, pages 1526-1540, September 2006

The invention claimed is:

1. A headset configured to be worn by a user, the headset comprising
an input stage for providing an electric input signal representing an input sound;
an output transducer for providing stimuli perceivable to the user as sound in dependence of said input sound or a processed version thereof;
an audio signal forward path being defined from the input transducer to the output transducer;
the headset further comprising
an input buffer connected to the input transducer configured to store audio data representing one or more time segments of the electric input signal;
an own voice detector for estimating whether or not, or with what probability, said input sound originates from the voice of the user at a given point in time, and providing an own voice control signal indicative thereof;
wherein the audio signal forward path comprises a combiner, allowing to insert audio data from said input buffer in said forward audio signal path, said inserted audio data being selected in dependence of an output control signal;
wherein the headset further comprises
an input controller connected to the input buffer and adapted to receive said electric input signal or a signal derived therefrom, the input controller being configured to control whether or not to store a time segment of the electric input signal in the input buffer at a given point in time in dependence of said own voice control signal; and
an output controller connected to the input buffer and configured to select audio data from said one or more time segments of the electric input signal currently stored in the input buffer for insertion in the audio signal forward path at a given point in time in dependence of said output control signal, wherein said output control signal originates from the user.

2. A headset according to claim 1 comprising a voice activity detector for estimating whether or not, or with what probability, said input sound comprises a voice signal at the given point in time, and providing a voice activity control signal indicative thereof; and wherein the input controller is configured to control whether or not to store the electric input signal in the input buffer at a given point in time in dependence of said voice activity control signal.

3. A headset according to claim 1 wherein the input controller is configured to store the electric input signal in the input buffer at a given point in time when said own voice control signal indicates an absence of the voice of the user, or the probability of its presence below a threshold value.

4. A headset according to claim 3 wherein the input controller is configured to store the electric input signal in the input buffer at a given point in time when said voice activity control signal indicates the presence of a voice signal, or the probability of its presence above a threshold value.

5. A headset according to claim 1 comprising a speech analyzer connected to the input buffer and configured to analyze at least one, such as all, of the one or more time segments of the electric input signal.

6. A headset according to claim 5 wherein the speech analyzer is configured to identify sub-sections of the audio data of the one or more time segments stored in the input buffer at a given point in time.

7. A headset according to claim 1 comprising or being connectable to a user interface.

8. A headset according to claim 6, wherein the hearing aid comprises or is connectable to a user interface and is configured to transfer information about said identified sub-sections to the user interface.

9. A headset according to claim 6, wherein the hearing aid comprises or is connectable to a user interface and the output controller is configured to select at least one of said sub-sections from the audio data of the input buffer for insertion in the audio signal forward path of the headset in dependence of said output control signal.

10. Headset according to claim 9 configured to allow a user to select said sub-sections in a configurable order of appearance in the input buffer.

11. A headset according to claim 7 configured to allow an input from the user to the output controller to be received via the user interface as a written or spoken command.

12. A headset according to claim 1 comprising a voice control interface.

13. A headset according to claim 1 comprising a specific start word detector configured to initiate a storage mode of operation, when the start word is detected.

14. A headset according claim 6 wherein said sub-sections of the one or more time segments identified by the speech analyzer are individual sentences.

15. A headset according to claim 14 wherein the speech analyzer comprises a neural network trained to identify individual sentences in an audio stream, e.g. in an audio stream comprising noisy speech.

16. A headset according to claim 1 comprising a replay controller for controlling the presenting of said one or more time segments or selected sub-sections thereof to the user via said output transducer.

17. A headset according to claim 1 wherein the stimuli based on the inserted audio data in the forward audio path and/or the incoming audio data inserted audio data is speeded up.

18. A method of operating a headset configured to be worn by a user at or in an ear of the user, the headset comprising an audio signal forward path from an input stage to an output transducer, the method comprising
 providing by said input transducer an electric input signal representing an input sound;
 providing by said output transducer stimuli perceivable to the user as sound in dependence of said input sound or a processed version thereof;
 storing one or more time segments of the electric input signal;
 estimating whether or not, or with what probability, said input sound originates from the voice of the user at the given point in time, and providing an own voice control signal indicative thereof; and,
 controlling whether or not to store the electric input signal in the input buffer at a given point in time in dependence of said own voice control signal; and
 selecting audio data from said one or more time segments of the electric input signal currently stored in the input buffer for insertion in the audio signal forward path at a given point in time in dependence of an output control signal, wherein said output control signal originates from the user; and
 inserting said selected audio data in the audio signal forward path.

19. Use of a headset as claimed in claim 1.

20. A non-transitory computer readable medium storing an application, termed an APP, comprising executable instructions configured to be executed on an auxiliary device to implement a user interface for a headset according to claim 1.

* * * * *